US010931361B2

(12) United States Patent
Park et al.

(10) Patent No.: US 10,931,361 B2
(45) Date of Patent: Feb. 23, 2021

(54) METHOD FOR TRANSMITTING AND RECEIVING CHANNEL STATE INFORMATION-REFERENCE SIGNAL IN WIRELESS COMMUNICATION SYSTEM, AND APPARATUS THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR); Haewook Park, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/317,793

(22) PCT Filed: Jun. 28, 2018

(86) PCT No.: PCT/KR2018/007363
§ 371 (c)(1),
(2) Date: Jan. 14, 2019

(87) PCT Pub. No.: WO2019/004756
PCT Pub. Date: Jan. 3, 2019

(65) Prior Publication Data
US 2020/0112359 A1 Apr. 9, 2020

Related U.S. Application Data

(60) Provisional application No. 62/533,645, filed on Jul. 17, 2017, provisional application No. 62/526,342, filed on Jun. 28, 2017.

(51) Int. Cl.
H04B 7/08 (2006.01)
H04L 5/02 (2006.01)
H04L 5/00 (2006.01)

(52) U.S. Cl.
CPC ............ *H04B 7/086* (2013.01); *H04L 5/0044* (2013.01); *H04L 5/0057* (2013.01); *H04L 5/023* (2013.01)

(58) Field of Classification Search
CPC .......... H04L 5/00; H04W 24/10; H04W 72/08
See application file for complete search history.

(56) References Cited

U.S. PATENT DOCUMENTS

2017/0288743 A1* 10/2017 Nam ................. H04L 5/0053
2019/0159209 A1* 5/2019 Xiao ................. H04W 72/085
(Continued)

FOREIGN PATENT DOCUMENTS

JP 2013150268 8/2013

OTHER PUBLICATIONS

ZTE-R1-1710194, On CSI-RS for beam management, TSG RAN WG1 Ad-Hoc#2, 3GPP data of server publication (Jun. 17, 2017), 10 pages (Year: 2017).*
(Continued)

*Primary Examiner* — Romani Ohri
(74) *Attorney, Agent, or Firm* — Fish & Richardson P.C.

(57) ABSTRACT

The present specification provides a method for transmitting and receiving channel state information (CSI) in a wireless communication system.
More specifically, a method performed by a user equipment (UE) includes receiving a resource block from a base station based on a first spatial Quasi-Co location (QCL) related parameter related to reception of the resource block including at least one control channel, wherein when the resource block and the CSI-RS are configured on the same symbol, the first spatial QCL related parameter and a second spatial QCL related parameter configured for reception of the CSI-RS are equally configured; configuring a beam for receiving the CSI-RS based on the second spatial QCL
(Continued)

related parameter; and receiving the CSI-RS from the base station through the configured beam.

The present specification has an effect that a UE, in which a less number of Rx chains are implemented, can receive multiple CSI-RSs.

9 Claims, 12 Drawing Sheets

(56) References Cited

U.S. PATENT DOCUMENTS

2019/0215044 A1* 7/2019 Noh ................... H04B 7/0421
2020/0053778 A1* 2/2020 Babaei ............... H04W 72/042

OTHER PUBLICATIONS

Nokia, Alcatel-Lucent Shanghai Bell, "On CSI-RS Design for DL Beam Management," RI-1703179, 3GPP TSG RAN WG1 #88, Athens, Greece, dated Feb. 13-17, 2017, 14 pages (Year: 2017).*

Lenovo, Motorola Mobility, "Discussion of RS for DL beam management," RI-1710595, 3GPP TSG RAN WG1 NR Ad-Hoc#2, Qingdao, P.R. China, dated Jun. 27-30, 2017, 3 pages (Year: 2017).*

Samsung, R1-1711604, Beam Management for PDCCH, TSG RAN WG1 Meeting NR AH2, 3GPP Date of server publication (Jun. 23, 2017), 6 pages.

ZTE, R1-1710194, On CSI-RS for beam management, TSG RAN WG1 Ad-Hoc#2, 3GPP Date of server publication (Jun. 17, 2017), 10 pages.

Samsung, R1-1710654, DL beam management for NR, TSG RAN WG1 Ad-Hoc#2, 3GPP Date of server publication (Jun. 16, 2017), 4 pages.

3GPP TS 36.331 v.11.5.0 (Sep. 19, 2013), 347 pages.

LG Electronics, "Discussion on CSI acquisition framework," R1-1700476, 3GPP TSG RAN WG1 NR Ad-Hoc Meeting, Spokane, USA, dated Jan. 16-20, 2017, 5 pages.

Nokia, Alcatel-Lucent Shanghai Bell, "On CSI-RS Design for DL Beam Management," R1-1703179, 3GPP TSG RAN WG1 #88, Athens, Greece, dated Feb. 13-17, 2017, 14 pages.

ZTE, "On CSI-RS for beam management," R1-1707128, 3GPP TSG RAN WG1 Meeting #89, Hangzhou, P.R. China, dated May 15-19, 2017, 8 pages.

CATT, "Further considerations on downlink beam management," R1-1710056, 3GPP TSG RAN WG1 NR Ad-Hoc#2, Qingdao, P.R. China, dated Jun. 27-30, 2017, 5 pages.

Extended European Search Report in European Application No. 18824824.9, dated Jan. 20, 2020, 9 pages.

Lenovo, Motorola Mobility, "Discussion of RS for DL beam management," R1-1710595, 3GPP TSG RAN WG1 NR Ad-Hoc#2, Qingdao, P.R. China, dated Jun. 27-30, 2017, 3 pages.

Nokia, Alcatel-Lucent Shanghai Bell, "CSI-RS Configuration for L3 Mobility Purposes," R1-1711392, 3GPP TSG-RAN WG1 NR Adhoc #2, Qingdao, P.R. China, dated Jun. 27-30, 2017, 8 pages.

Japanese Office Action in Japanese Appln. No. 2019-551294, dated Nov. 10, 2020, 7 pages. (with English translation).

* cited by examiner

【Figure 1】
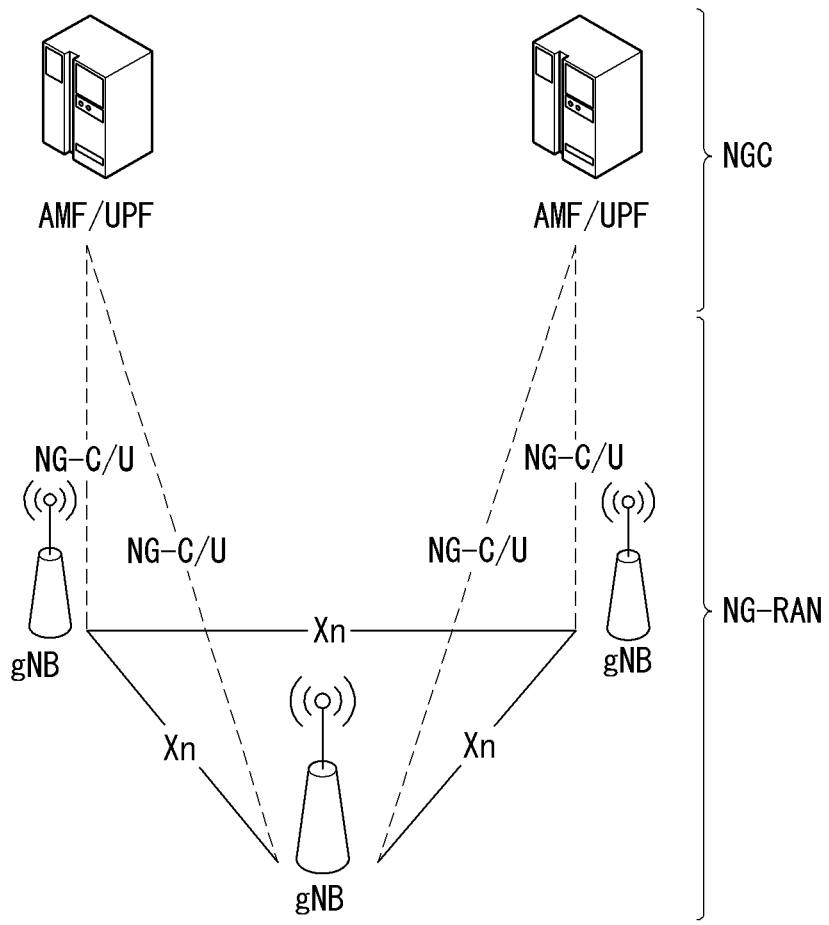
【Figure 2】
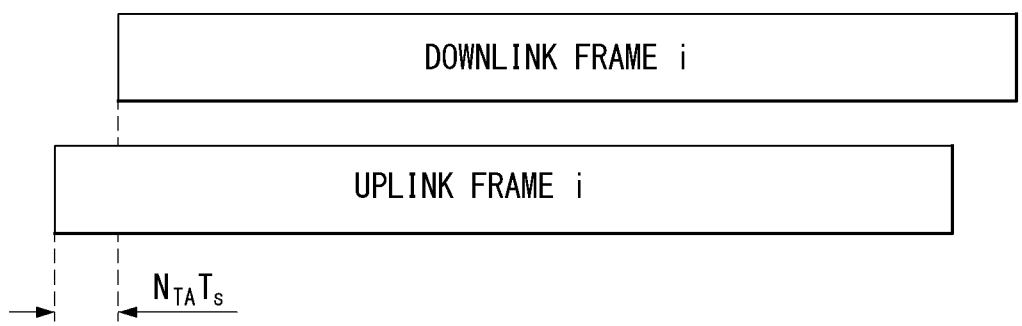

[Figure 3]
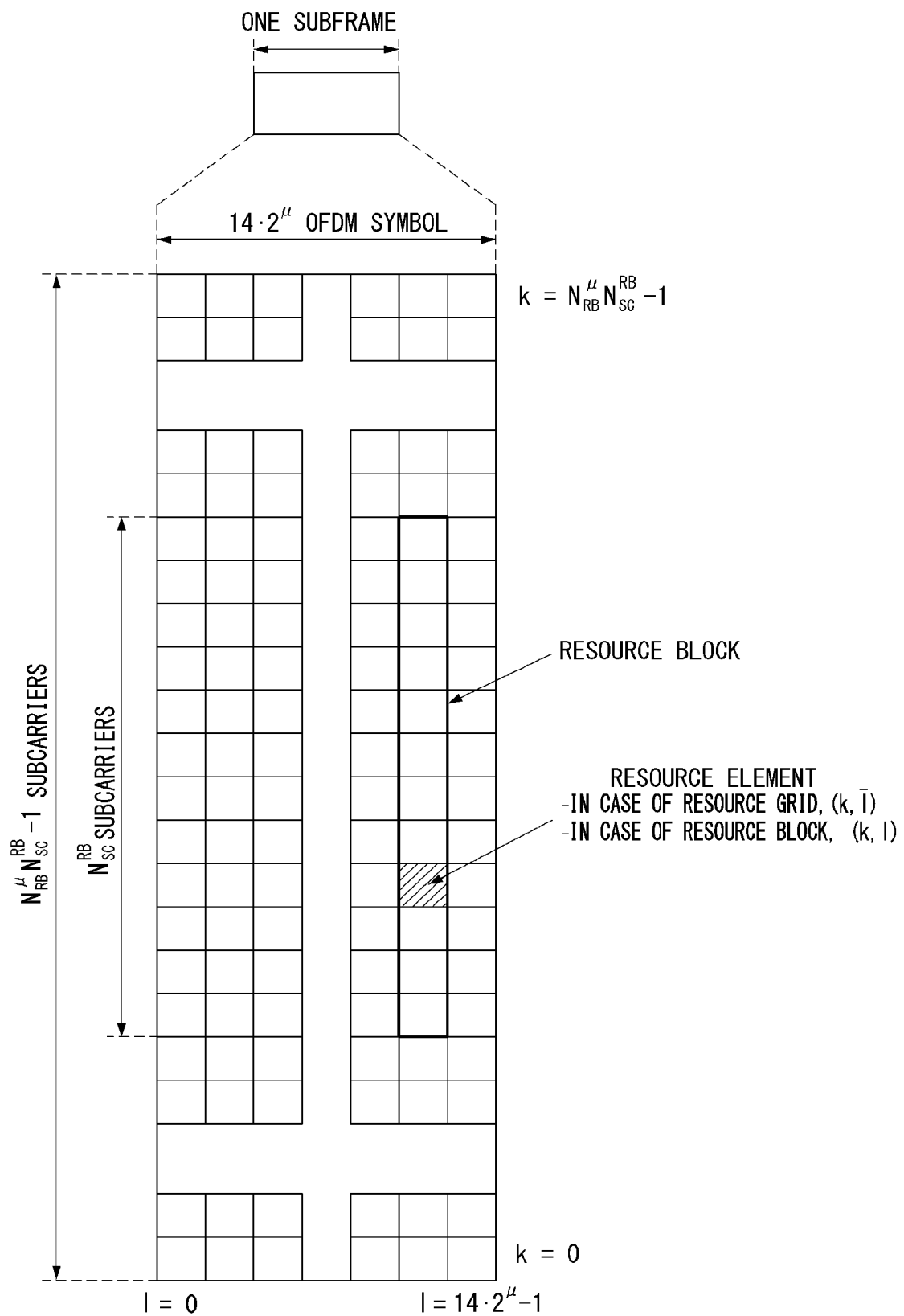

[Figure 4]
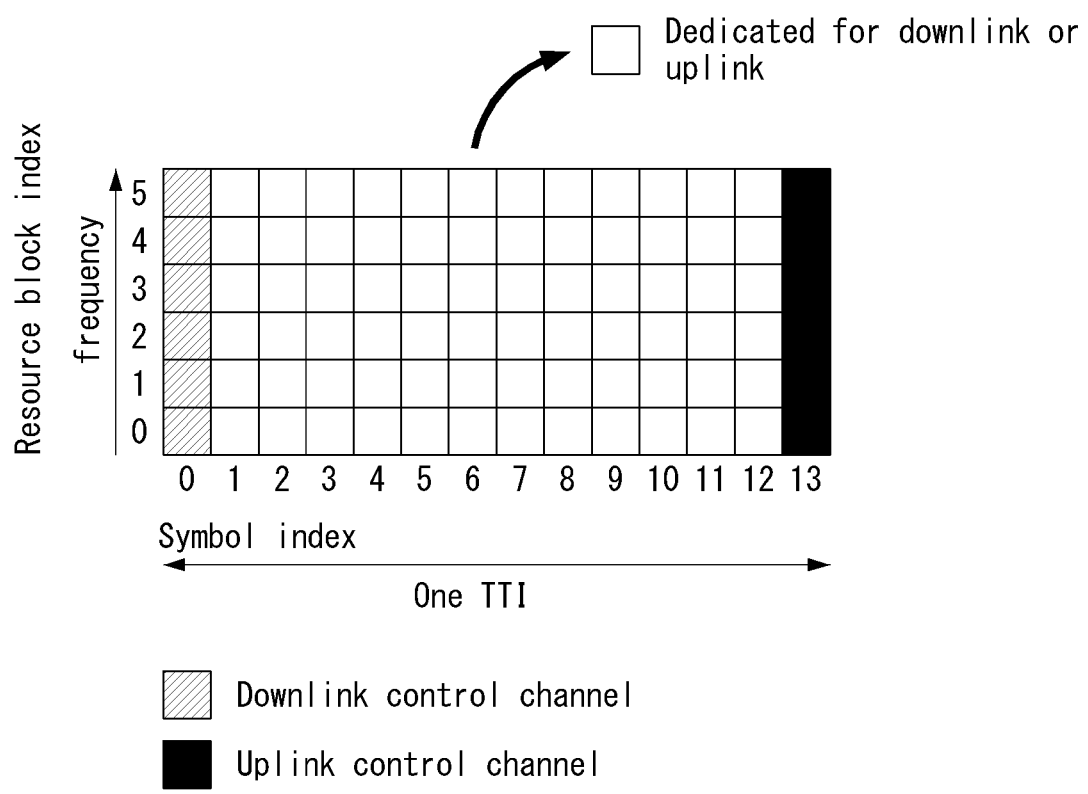

[Figure 5]
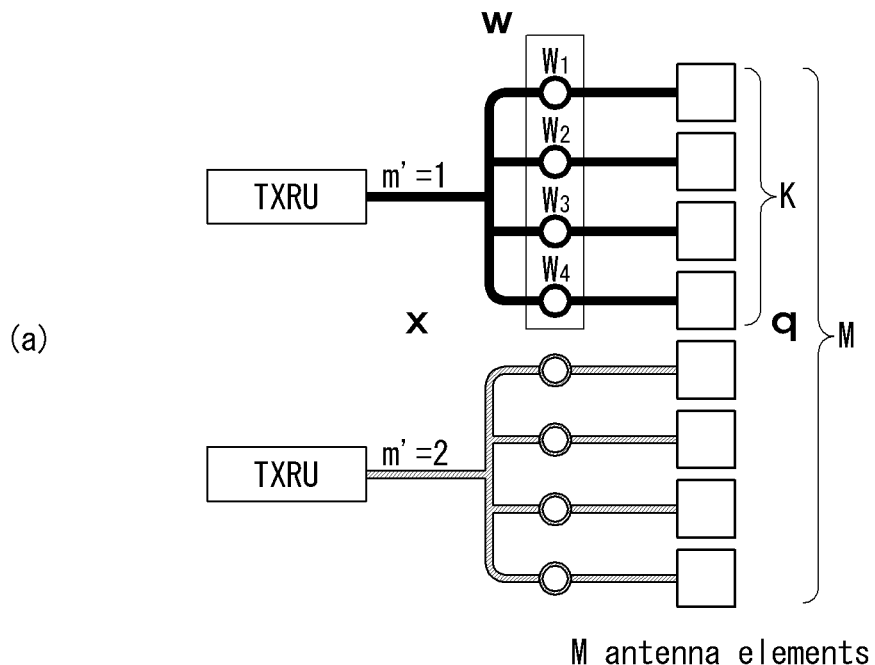
(a)
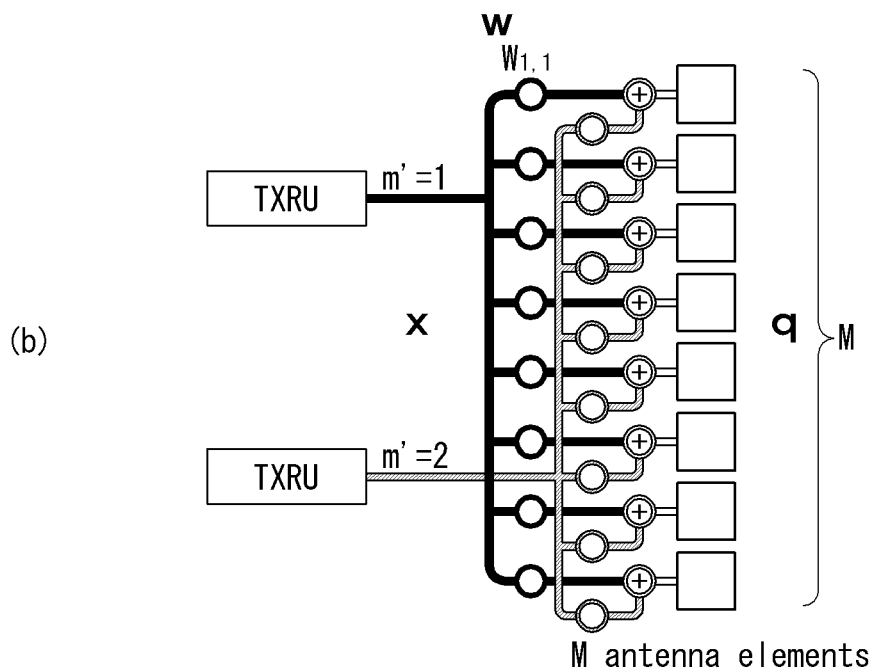
(b)

[Figure 6]
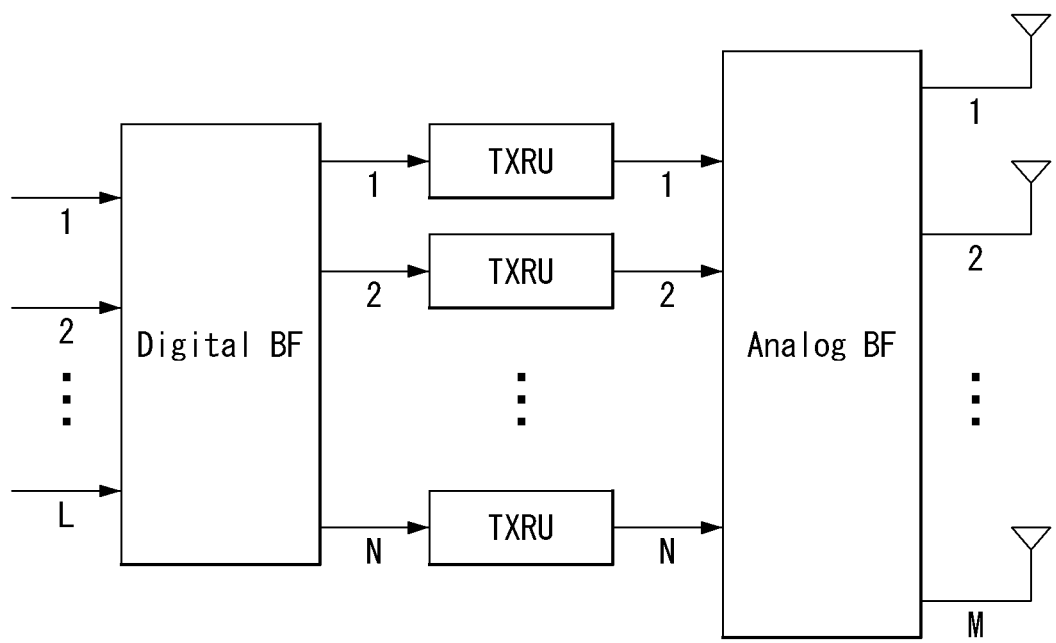

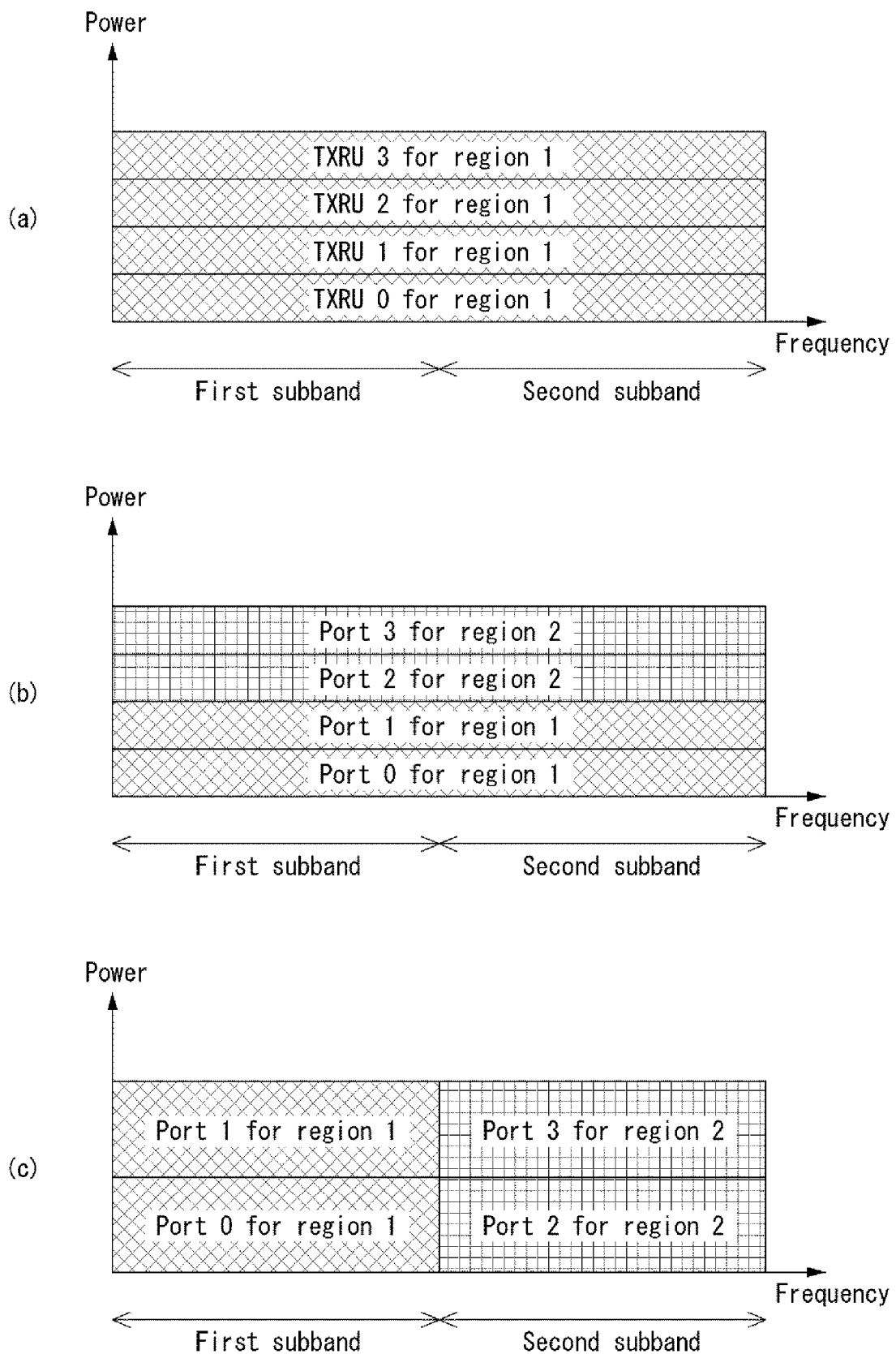
[Figure 7]

[Figure 8]
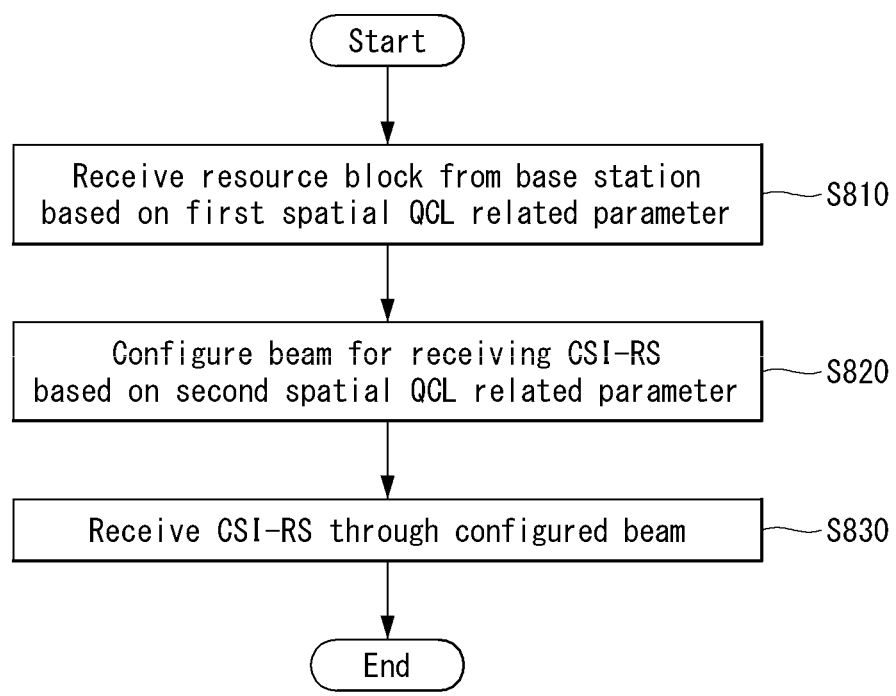

[Figure 9]
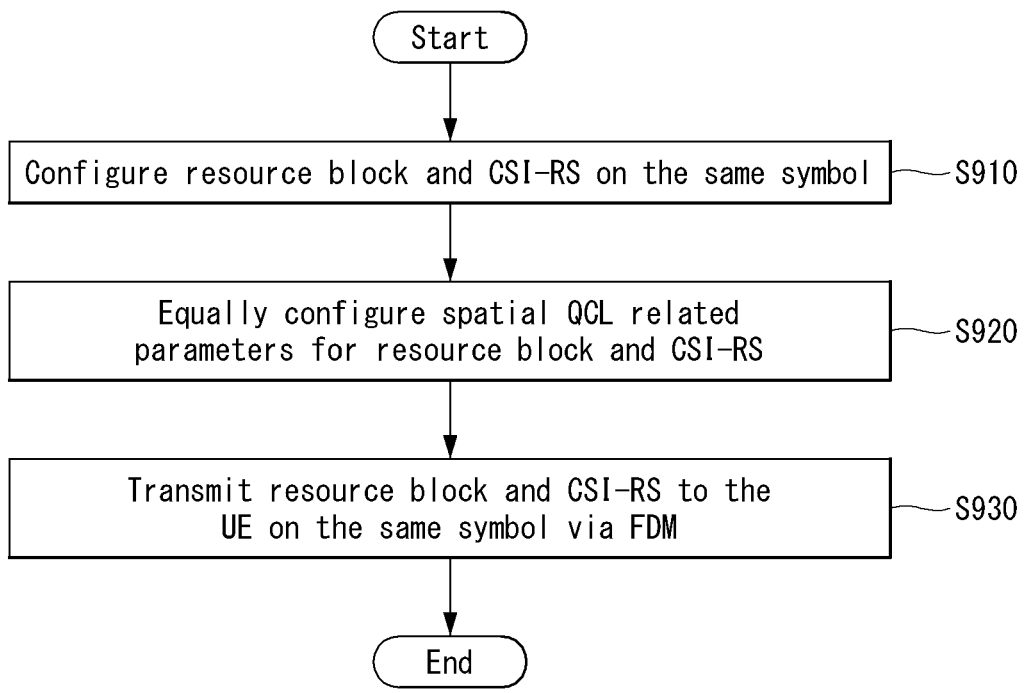

[Figure 10]
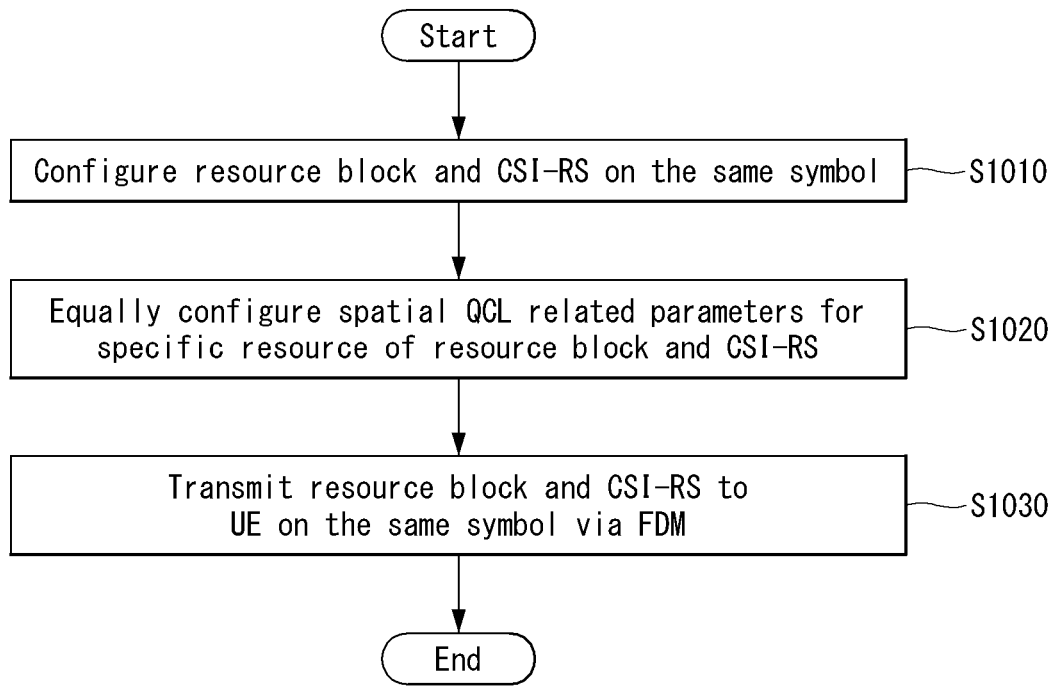
[Figure 11]
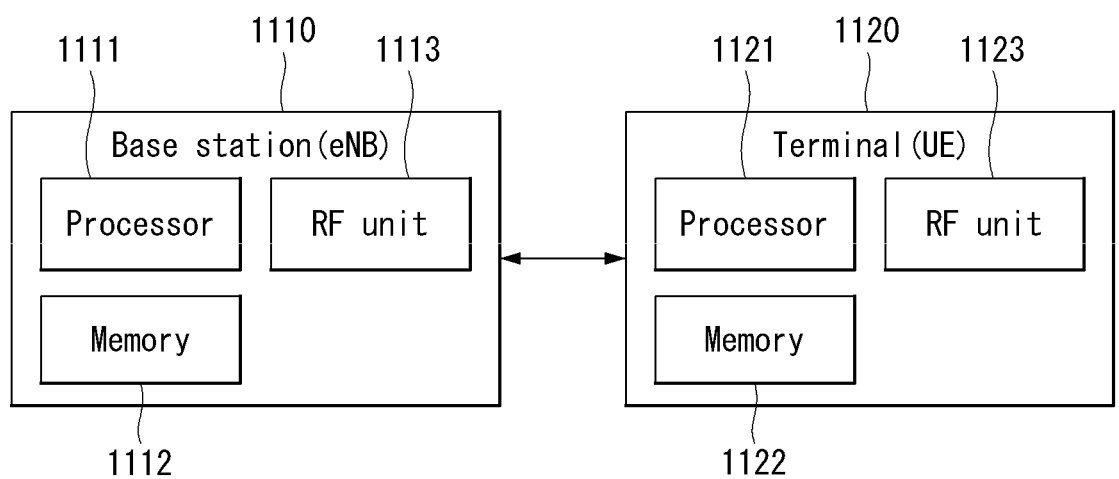

[Figure 12]
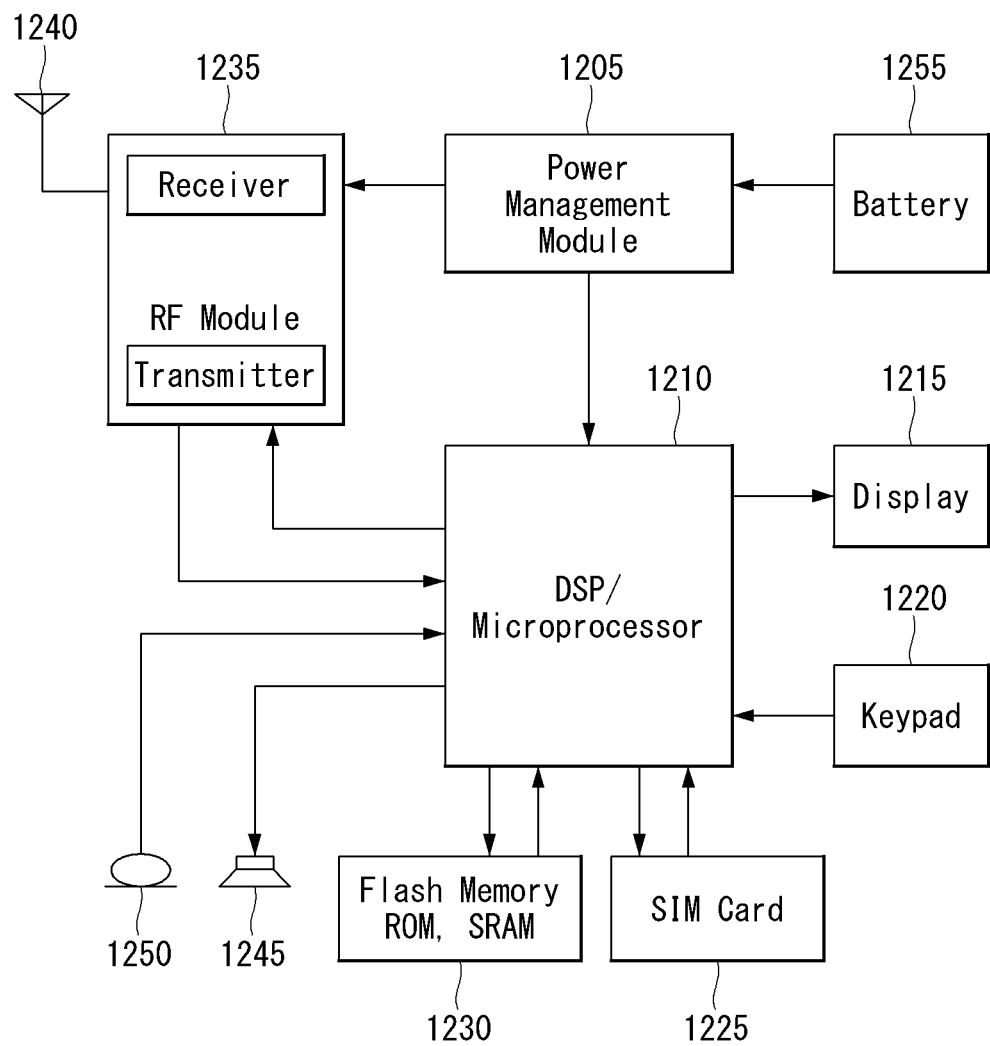

US 10,931,361 B2

METHOD FOR TRANSMITTING AND RECEIVING CHANNEL STATE INFORMATION-REFERENCE SIGNAL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2018/007363, filed on Jun. 28, 2018, which claims the benefit of U.S. Provisional Application No. 62/526,342 filed on Jun. 28, 2017 and U.S. Provisional Application No. 62/533,645 filed on Jul. 17, 2017, the contents of which are all hereby incorporated by reference herein in their entirety.

TECHNICAL FIELD

The present specification relates to a wireless communication system, and more particularly to a method for transmitting and receiving a channel state information (CSI)-reference signal (RS) and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present specification is to provide a method for performing frequency division multiplexing (FDM) between a CSI-RS and a specific resource block on the same symbol.

Another object of the present specification is to provide a method for solving a collision problem occurring when FDM is performed between a CSI-RS and a specific resource block.

Technical problems to be solved by the present invention are not limited by the above-mentioned technical problems, and other technical problems which are not mentioned above can be clearly understood from the following description by those skilled in the art to which the present invention pertains.

Technical Solution

The present specification provides a method for transmitting and receiving a CSI-RS in a wireless communication system.

More specifically, a method performed by a user equipment (UE) comprises receiving a resource block from a base station based on a first spatial Quasi-Co location (QCL) related parameter related to reception of the resource block including at least one control channel, wherein when the resource block and the CSI-RS are configured on the same symbol, the first spatial QCL related parameter and a second spatial QCL related parameter configured for reception of the CSI-RS are equally configured; configuring a beam for receiving the CSI-RS based on the second spatial QCL related parameter; and receiving the CSI-RS from the base station through the configured beam.

In the present specification, the resource block and the CSI-RS are frequency division multiplexed (FDM) on the same symbol.

In the present specification, the CSI-RS is received from a CSI-RS resource configured for beam management (BM).

In the present specification, the CSI-RS is a CSI-RS of a specific number of ports or less.

In the present specification, a value of the specific number of ports is configured by radio resource control (RRC) signaling.

In the present specification, the resource block is a synchronization signal block (SSB) or a control resource set (CORESET).

In the present specification, when the resource block is the CORESET, the first spatial QCL related parameter is configured for a specific resource of the resource block.

In the present specification, the specific resource of the resource block is a resource related to a physical downlink control channel (PDCCH) of the CORESET.

The present specification also provides a method for transmitting, by a base station, a channel state information (CSI)-reference signal (RS) in a wireless communication system, the method comprising configuring a resource block including at least one control channel and the CSI-RS on the same symbol; configuring a spatial Quasi-Co location (QCL) related parameter for the CSI-RS to be the same as a spatial QCL related parameter for the resource block; and transmitting the resource block and the CSI-RS to a user equipment (UE) on the configured same symbol via frequency division multiplexing (FDM).

The present specification also provides a user equipment (UE) for receiving a channel state information (CSI)-reference signal (RS) in a wireless communication system, the UE comprising a radio frequency (RF) module configured to transmit and receive a radio signal; and a processor functionally coupled to the RF module, wherein the processor is configured to receive a resource block from a base station based on a first spatial Quasi-Co location (QCL) related parameter related to reception of the resource block including at least one control channel, wherein when the resource block and the CSI-RS are configured on the same symbol, the first spatial QCL related parameter and a second spatial QCL related parameter configured for reception of the CSI-RS are equally configured; configure a beam for receiving the CSI-RS based on the second spatial QCL related parameter; and receive the CSI-RS from the base station through the configured beam.

The present specification also provides a base station for transmitting a channel state information (CSI)-reference signal (RS) in a wireless communication system, the base station comprising a radio frequency (RF) module configured to transmit and receive a radio signal; and a processor functionally coupled to the RF module, wherein the processor is configured to configure a resource block including at least one control channel and the CSI-RS on the same symbol; configure a spatial Quasi-Co location (QCL) related parameter for the CSI-RS to be the same as a spatial QCL related parameter for the resource block; and transmit the resource block and the CSI-RS to a user equipment (UE) on the configured same symbol via frequency division multiplexing (FDM).

Advantageous Effects

The present specification has an effect that a UE, in which a less number of Rx chains are implemented, can receive a plurality of CSI-RSs.

The present specification has an effect capable of increasing a system performance by solving a collision problem which may occur when FDM is applied between a CSI-RS and a specific resource block.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, that are included to provide a further understanding of the invention and are incorporated in and constitute a part of the present specification, illustrate embodiments of the invention and together with the description serve to explain various principles of the invention.

FIG. 1 illustrates an example of an overall system structure of NR to which a method proposed by the present specification is applicable.

FIG. 2 illustrates a relationship between an uplink frame and a downlink frame in a wireless communication system to which a method proposed by the present specification is applicable.

FIG. 3 illustrates an example of a resource grid supported in a wireless communication system to which a method proposed by the present specification is applicable.

FIG. 4 illustrates an example of a self-contained subframe structure to which a method proposed by the present specification is applicable.

FIG. 5 illustrates a model of a transceiver unit in a wireless communication system to which the present invention is applicable.

FIG. 6 schematically illustrates a hybrid beamforming structure in terms of TXRU and a physical antenna in a wireless communication system to which the present invention is applicable.

FIG. 7 illustrates a service area per transceiver unit in a wireless communication system to which the present invention is applicable.

FIG. 8 is a flow chart illustrating an operation of a UE related to reception of a CSI-RS proposed by the present specification.

FIG. 9 is a flow chart illustrating an operation of a base station related to transmission of a CSI-RS proposed by the present specification.

FIG. 10 is another flow chart illustrating an operation of a UE related to reception of a CSI-RS proposed by the present specification.

FIG. 11 illustrates a block configuration diagram of a wireless communication device to which methods proposed by the present specification are applicable.

FIG. 12 illustrates a block configuration diagram of a communication device according to an embodiment of the present invention.

MODE FOR INVENTION

Figure 13:
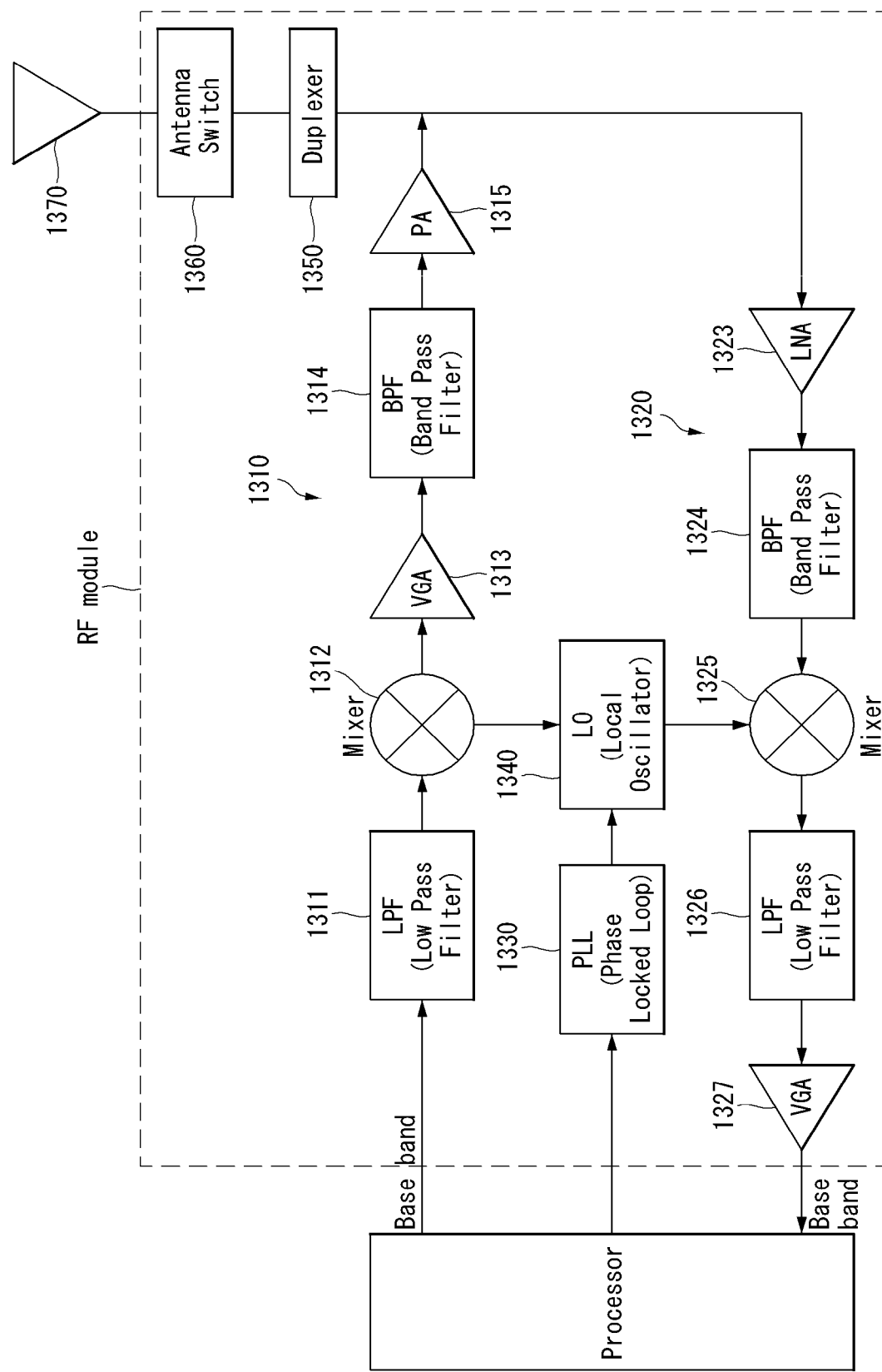
FIG. 13 illustrates an example of a RF module of a wireless communication device to which a method proposed by the present specification is applicable.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

DEFINITION OF TERMS eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$ and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2 $\mu$ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k,l) Herein, k=0, . . . , $N_{RB}^{\mu}N_{sc}^{RB}-1$ is an index in the frequency domain, and l=0 . . . , $2^{\mu}N_{symb}^{(\mu)}-1$ indicates a location of a symbol in a subframe. To indicate a resource element in a slot, the index pair (k,l) is used. Herein, l=0, . . . , $N_{symb}^{\mu}-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

Hybrid BF may be considered, which is an intermediate between digital BF and analog BF and has the number of TXRUs B less than the number of antenna elements Q. In this case, although varying depending upon a method of connecting the number of TXRU B and the number of antenna elements Q, beam directions capable of being transmitted at the same time are restricted to be less than B.

Hereinafter, typical examples of a method of connecting TXRUs and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Furthermore, in the new RAT system, if multiple antennas are used, a hybrid beamforming scheme in which digital beamforming and analog beamforming have been combined is emerging.

In this case, the analog beamforming (or radio frequency (RF) beamforming) means an operation for an RF stage to perform precoding (or combining). In the hybrid beamforming, each of a baseband stage and an RF stage performs precoding (or combining). Accordingly, there are advantages in that the number of RF chains and the number of digital (D)/analog (A) (or A/D) converters are reduced and performance closer to that of digital beamforming can be achieved.

For convenience sake, a hybrid beamforming structure may be expressed as N transceiver units (TXRU) and M physical antennas. In this case, digital beamforming for L data layers to be transmitted by a transmission stage may be expressed as an N by L matrix. Thereafter, converted N digital signals are converted into an analog signal via the TXRU, and analog beamforming expressed in an M by N matrix is then applied to the analog signal.

FIG. 6 is a diagram showing a hybrid beamforming structure in the TXRU and physical antenna viewpoint in a wireless communication system to which the present invention may be applied.

FIG. 6 illustrates a case where the number of digital beams is L and the number of analog beams is N.

The new RAT system is designed so that a base station can change analog beamforming in units of symbol in order to support more efficient beamforming for a UE positioned in a specific area. Furthermore, when specific N TXRUs and M RF antennas are defined as one antenna panel in FIG. 6, a method of introducing a plurality of antenna panels to which independent hybrid beamforming can be applied is taken into consideration in the new RAT system.

Channel State Information (CSI) Feedback

In the 3GPP LTE/LTE-A system, a user equipment (UE) has been defined to report channel state information (CSI) to a base station (BS or eNB).

CSI collectives indicates information capable of indicating quality of a radio channel (or also called a link) formed between a UE and an antenna port. For example, a rank indicator (RI), a precoding matrix indicator (PMI) or a channel quality indicator (CQI) corresponds to CSI.

In this case, the RI indicates rank information of a channel and means the number of streams received by a UE through the same time-frequency resource. This value is determined depending on the long term fading of a channel, so the RI has a longer period than a PMI or CQI and is fed back from a UE to a BS. The PMI is a value into which a channel space characteristic has been incorporated, and indicates a precoding index preferred by a UE based on metric, such as a signal-to-interference-plus-noise ratio (SINR). The CQI is a value indicative of the intensity of a channel and means a received SINR that may be obtained when a BS uses a PMI.

In the 3GPP LTE/LTE-A system, a BS configures multiple CSI processes for a UE and may receive CSI reporting for each process. In this case, the CSI process includes a CSI-RS for signal quality measurement from a BS and a CSI-interference measurement (CSI-IM) resource for interference measurement.

Reference Signal (RS) Virtualization

In mmW, a PDSCH may be transmitted in one analog beam direction only at one occasion through analog beamforming. In this case, data transmission may be possible from a BS to only some UEs in the corresponding direction. Accordingly, data transmission may be performed on multiple UEs in several analog beam directions at the same time by differently configuring the analog beam directions on an antenna port basis, if necessary.

FIG. 7 is a diagram illustrating a service area for each transceiver unit in a wireless communication system to which the present invention can be applied.

In FIG. 7, four sub-arrays are formed by dividing 256 antenna elements into four sub-arrays, and a TXRU is connected to a sub-array as shown in FIG. 5.

If each sub-array is composed of 64 (8×8) antenna elements in the form of a two-dimensional array, a specific analog beamforming can cover a 15-degree horizontal angle area and a 15-degree vertical angle area.

That is, the area where the base station should be served is divided into a plurality of areas, and services are provided one at a time.

In the following description, it is assumed that a CSI-RS antenna port and a TXRU are mapped to one-to-one.

Therefore, the antenna port and TXRU have the same meaning in the following description.

If all the TXRUs (i.e., TXRU 0, 1, 2, 3) have the same analog beamforming direction (i.e., region 1) as in FIG. 7(*a*), it is possible to increase a throughput of a corresponding region by forming a digital beam having a resolution.

Also, it is possible to increase the throughput of the area by increasing the rank of the transmission data to the area.

As in FIGS. 7 (*b*) and 7 (*c*), each TXRU (antenna port, i.e., port 0, 1, 2, 3) has different analog beamforming directions (region 1 or region 2), UEs distributed over a wider area can transmit data simultaneously in a corresponding subframe (SF).

As shown in FIGS. 7 (*b*) and 7 (*c*), two of four antenna ports are used for PDSCH transmission to UE1 in region 1 and the remaining two are used for PDSCH transmission to UE2 in region 2.

In particular, FIG. 7 (*b*) shows an example in which PDSCH1 transmitted to UE1 and PDSCH2 transmitted to UE2 are space division multiplexed (SDM).

Alternatively, as shown in FIG. 7C, the PDSCH1 transmitted to the UE1 and the PDSCH2 transmitted to the UE2 may be transmitted by frequency division multiplexing (FDM).

In order to maximize the cell throughput among the methods of servicing one area using all antenna ports and dividing the antenna ports and simultaneously providing services to multiple areas, a rank, a modulation and coding scheme (MCS: Modulation and Coding Scheme). Also, the preferred scheme may be changed depending on the amount of data to be transmitted to each UE.

The base station calculates the cell throughput or scheduling metric that can be obtained when servicing one region using all antenna ports and divides the antenna port to calculate the cell throughput or scheduling metric that can be obtained when servicing the two regions. do.

The BS can select the final transmission scheme by comparing cell throughput or scheduling metric obtained through each scheme. As a result, the number of antenna ports participating in the PDSCH transmission may be varied in units of subframes (SF-by-SF).

In order to calculate the transmission MCS of the PDSCH according to the number of antenna ports and reflect it in the scheduling algorithm, the CSI feedback from the UE is required.

Hereinafter, a channel state information (CSI) reporting rule based on a partially dropped reference signal (RS) proposed by the present specification is described.

First, the necessity to discuss the contents to be described later is as follows.

A CSI-RS in a new radio (NR) system is configured to be flexible only in some bands compared to the LTE system.

When multiple CSI-RSs are transmitted through analog beams, a terminal should implement RX chain capable of receiving the CSI-RSs transmitted through multiple beams to be suitable for the CSI-RS.

However, in case of a terminal with one Rx chain, there may a problem that the corresponding terminal cannot receive multiple CSI-RSs transmitted in different beam directions.

Accordingly, methods for solving the problem will be described below.

Various options related to whether a symbol capable of transmitting the CSI-RS and other reference signal (RS) or channel can be configured to be MUXed (or multiplexed) (on a frequency domain) may be considered as follow.

That is, various options related to a location of a CSI-RS OFDM symbol may be considered.

Here, the other RS or channel may be, for example, a synchronization signal (SS) block (SSB), a control channel, a demodulation reference signal (DMRS), etc.

In this specification, 'A and/or B' may be interpreted in the same sense as 'including at least one of A or B'.

In this specification, 'define' or 'configure' or 'indicate' or 'constitute' may be interpreted in the same sense.

In this specification, 'perform' or 'apply' may be interpreted in the same sense.

In this specification, 'whether' or 'assume' may be interpreted in the same sense.

Various Options Related to CSI-RS OFDM Symbol Location

First, Option 1 may include the following two options.

Option 1-1 is that from a terminal (e.g., UE) perspective, CSI-RS is not multiplexed on SS block (SSB) OFDM symbol(s).

Option 1-2 is that from a UE perspective, CSI-RS can be multiplexed on SS block (SSB) symbol(s).

Next, option 2 may include the following two options.

Option 2-1 is that from a UE perspective, CSI-RS is not multiplexed on PDCCH OFDM symbol(s) for normal slots.

Option 2-2 is that from a UE perspective, CSI-RS can be multiplexed on PDCCH OFDM symbol(s) for normal slots.

For reference, a PDCCH decoding behavior at UE side is not changed by the option 2-2.

Next, option 3 may include the following two options.

Option 3-1 is that from a UE perspective, CSI-RS is not multiplexed on all potential DMRS OFDM symbol(s) for a slot with at least 7/14 OFDM symbol(s).

Option 3-2 is that from a UE perspective in a slot with scheduled PDSCH, CSI-RS can be transmitted on potential additional DMRS OFDM symbol(s), when additional DMRS does not exist in the OFDM symbol(s).

For reference, in the option 3-2, the CSI-RS is not multiplexed on potential front-loaded DMRS OFDM symbol(s).

Option 3-3 is that from a UE perspective, CSI-RS can be multiplexed on all potential DMRS OFDM symbol(s).

In a case (e.g., the Options 1-2, 2-2, 3-2 and 3-3) of allowing that a specific RS on the same specific time instance (e.g., one OFDM symbol) and the other RS or channel (e.g., SS block, control channel, DMRS, etc.) are configured to be multiplexed (on a frequency domain), a problem may occur upon specific CSI reporting based on the CSI-RS.

An example of the specific RS may be CSI-RS used at least for channel estimation.

An example of the specific CSI reporting may be subband CSI reporting.

A situation and a solution method that may cause the problem upon the specific CSI reporting mentioned above are classified into wideband CSI reporting and subband CSI reporting, which will be described in more detail below.

Regarding Wideband CSI Reporting

When the UE is defined to receive configuration for a CSI-RS from the base station and measure the configured CSI-RS to perform specific wideband CSI reporting, the UE may assume that in CSI-RS measurement for a time point at which the specific MUX occurs (on the frequency domain), RE(s) of CSI-RS is/are punctured or dropped for partially at least one narrow band (e.g., subband(s)) for the wideband (e.g., full band) (hereinafter, the punctured or dropped CSI-RS RE(s) is/are referred to as "missed CSI-RS RE(s)" for convenience).

Accordingly, as described above, there may be a case where the CSI measurement for the partially at least one narrow band is missed.

In this case, the UE may be defined to apply at least one of the following two operation options and perform the wideband CSI reporting.

The UE may exclude locations of the "missed CSI-RS RE(s)", measure CSI for remaining unmissed CSI-RS RE(s), and calculate representative wideband CSI (and calculate a representative value through (specific weighted) averaging, etc.) to report the calculated CSI to the base station.

The representative wideband CSI may be, for example, CSI-RS resource Indicator (CRI), rank indicator (RI), precoding matrix indicator (PMI), and/or channel quality indicator (CQI), etc.

When the "missed CSI-RS RE(s)" on a specific frequency granularity (e.g., per subband) is/are missed in the corresponding frequency granularity at a specific pre-defined or pre-configurable threshold level or more, the UE may exclude the corresponding frequency granularity (e.g., subband(s)), measure CSI for CSI-RS RE(s) for remaining (intact) bands, and calculate representative wideband CSI (and calculate a representative value through (specific weighted) averaging, etc.) to report the calculated CSI to the base station.

An example of missing in the corresponding frequency granularity at the specific pre-defined or pre-configurable threshold level or more may include a case where X or more RE(s) (per port) are missed, where X may be 1 or larger than 1.

Because the base station can know information such as RE/RB (resource block)/SB (subband) corresponding to the drop or the puncturing, the base station may restrict to perform wideband (WB)/SB CSI measurement and CSI reporting only for corresponding RE/RB/SB by indicating ON of frequency domain measurement restriction (MR) at a time point at which the specific MUX occurs.

Here, the base station may apply the MR ON to the RB in which the CSI-RS is not multiplexed or the specific threshold or a specific number of ports or more exist.

Regarding Subband CSI Reporting

As described regarding the wideband CSI reporting, when the UE is defined to receive configuration for a CSI-RS from the base station and measure the configured CSI-RS to perform specific subband CSI reporting, the UE may assume that in CSI-RS measurement for a time point at which the specific MUX occurs, RE(s) of CSI-RS for each subband is punctured or dropped.

Accordingly, there may be a case where the CSI measurement for each subband is missed.

In this case, the UE may be defined to apply at least one of the following operation options and perform the CSI reporting.

(1) For each subband, in case of a subband in which locations of the "missed CSI-RS RE(s)" exist (the case of missing in the corresponding subband (or a RB or a RB group in the SB) granularity at a specific pre-defined or pre-configurable threshold level or more (for example, a case where X or more RE(s) (per port) are missed, where X is 1 or larger than 1), The UE may exclude locations of the "missed CSI-RS RE(s)", perform measurement for remaining unmissed CSI-RS RE(s), and calculate corresponding subband CSI (and calculate a representative value through (specific weighted) averaging, etc.) to report the calculated CSI to the base station.

Here, the subband CSI may be, for example, CSI-RS resource Indicator (CRI), rank indicator (RI), precoding matrix indicator (PMI), and/or channel quality indicator (CQI), etc.

The corresponding subband may be reported to the base station without a reporting result value including a request that the corresponding subband is excluded from a scheduling target, as a specific "out-of-range (OOR)" indication or "invalid CSI", etc., and/or a special case indicator indicating that normal CSI is difficult to be derived.

Or, the UE may be defined to apply the 'wideband CSI' value calculated according to at least one of the operations proposed in 'Regarding wideband CSI reporting' described above and perform the CSI reporting for the corresponding subband.

The reason is because there is an advantage that the subband can be the scheduling target with average CSI by replacing subband CSI with wideband CSI value and reporting the CSI, instead that inaccurate subband CSI is derived and is reported to the base station.

Or, the UE may perform a kind of extrapolation (e.g., a time domain and/or a frequency domain) together with an estimate value from (the same) corresponding RS for contiguous subband(s) or a previous time instance.

And, such permission of the operation itself may be configured to the UE.

(2) Or, the UE may be defined to calculate and report subband CSI per each subband, and at the same time, to additionally report representative CSI for the entire wideband.

The wideband CSI calculation and the CSI reporting can be defined to follow at least one of the operations proposed in 'Regarding wideband CSI reporting' mentioned above.

Each subband CSI reporting value may be determined (or reported) in a type of subband delta CSI (e.g., delta PMI, delta CQI, . . . ) compared to the representative wideband CSI.

The operation of the UE related to 'regarding subband CSI reporting' mentioned above can be similarly applied for larger frequency granularity (e.g., 'middle band', 'partial band', etc.), and different operations may be defined by a differential threshold, etc. per specific step when the frequency granularity is divided into several steps as described above.

Or, when the multiplexing transmitted CSI-RS (e.g., in case of aperiodic) appears at the specific "missed CSI-RS RE(s)" locations, specific explicit or implicit configurations may be defined to more efficiently apply the subband configuration (or partial band configuration) and the indexing.

For example, when MUX between a specific SS block (SSB) and the CSI-RS occurs, all the corresponding RBs may be processed as the missed CSI-RS RE(s) if the corresponding SS block appears over, for example, 24 RBs.

In this case, when at least one of the proposed operations described above is applied, it may not be effective in an operation for subband reporting of the UE, and performance degradation may be increased.

Accordingly, the 24 RBs are excluded from the subband indexing, and new subband configuration/re-indexing in a state in which the corresponding 24 RBs are excluded is applied. Hence, the generation of the missed CSI-RS RE(s) can be minimized, and the proper (subband) reporting can be performed.

When the 24 RBs are located around the (relative) center of the full band, an explicit or implicit indication may be provided in such a manner that a partial band configuration configured to the UE is different (or independent) from an existing operation, for example, in such a manner that specific partial band(s) exist (or are configured) in an upper part (e.g., lower frequency index) of the 24 RBs, and other specific partial band(s) exist (or are configured) in a lower part (e.g., higher frequency index) of the 24 RBs.

If there is no such a specific rule, partial bands may exist at predetermined intervals in the full (system) band.

In this case, a band corresponding to the 24 RBs may inevitably generate the "missed CSI-RS RE(s)" for one or more specific partial band(s), and thus may serve as a deterioration factor of a system performance.

Further, in this case, it may be defined so that the wideband CSI reporting is omitted (so that the base station does not configure it).

This is because when a region skipping the CSI-RS due to the specific 24 RBs is large, specific wideband CSI reporting including up to the skipping region may have a difficulty in having the meaning.

Accordingly, in this case, as mentioned above, it may be configured to perform reporting (e.g., 'partial-band reporting (instead of wideband reporting)') on a specific 'partial band' basis for each of the upper part and the lower part of the 24 RBs.

For example, subband CSI reporting may be configured such that multiple subbands are additionally configured (or indexed) in each partial band and specific suband CSI reporting is performed for the corresponding subband.

Further, because the base station can know information about SB related to the drop or the puncturing in advance even if the UE does not report the information to the base station, the base station can make a promise with the UE in advance or provide additional signaling to the UE so that the UE does not perform reporting on the SB related to the drop or the puncturing.

Accordingly, since the UE does not report CSI for the SB related to the drop or the puncturing to the base station, an overhead can be reduced.

The above operation description may basically be interpreted as operations applicable to the case of one-shot measurement (e.g., the case of measurement restriction (MR)-ON and/or the case of aperiodic CSI-RS).

Here, the one-shot measurement may mean CSI-RS measurement for an aperiodic (NZP) CSI-RS resource.

If CSI measurements that are configured as MR-OFF over multiple time instances can be averaged, at least one of the above operations may be (selectively) disabled.

When it is configured so that time-domain averaging such as 'MR-OFF' can be performed per specific CSI-RS based measurement, it may be defined to report the CSI to the base station by getting a value of a previous time point as it is (weighted averaging and/or moving averaging, etc.).

Examples of performing per specific CSI-RS based measurement may include performing per configured CSI-RS resource, per pre-resource setting, per CSI process, per measurement setting (link), and/or per reporting setting.

When it is configured so that the CSI measurement/reporting is performed only for a specific time point (or a set of restricted time intervals) such as 'MR-ON', it may be defined to apply at least one of the above proposed operations and perform the CSI reporting.

Or, when MUX occurs between specific signals (and/or channels), a specific restriction may be configured so that the subband reporting is not performed via the received CSI-RS (for corresponding symbol(s)).

That is, an operation of 'the UE does not expect that it is configured to perform the specific subband reporting via the received CSI-RS (for corresponding symbol(s)) when MUX occurs between the specific signals (and/or channels)' can be ensured.

This may be interpreted to mean that the base station should guarantee it.

Or, a specific restriction of 'the UE may be configured to perform only an operation of specific wideband reporting type via the CSI-RS received (for corresponding symbol(s)) when MUX occurs between the specific signals (and/or channels)' may be defined.

Additional operations for CSI-RS reporting that are more specified by including at least one of the proposed operations described above are described below.

That is, the following description is for an addition operation for CSI-RS reporting of the UE related to a CSI-RS OFDM symbol location.

A down-select among the following two options may be performed.

Option 1-1 is that, from a UE perspective, CSI-RS is not multiplexed on SS block OFDM symbol(s).

The UE may grasp all SS block locations of a specific transmission reception point (TRP) via broadcast information such as remaining minimum system information (RMSI), and then may not expect to be provided with configuration for a CSI-RS that overlaps at least one of respective potential SS block locations.

If configuration for the CSI-RS is provided, the UE can ignore corresponding CSI-RS configuration as a fault.

Or, the UE may inform the base station of it and request the reconfiguration for the CSI-RS.

Option 1-2 is that, from a UE perspective, CSI-RS can be multiplexed on SS block symbol(s).

The UE follows at least one of the above proposed options (option 1-1 and option 1-2). In this instance, the base station may provide the UE with information about "restricted sets of additional SS blocks" in such a manner that SS blocks, that are applied targets, apply an operation of the above option to "a set of some SS blocks" upon occurrence of the MUX.

Hence, the corresponding UE may reflect only the provided SS blocks in conditions for deciding whether "missed CSI-RS RE(s)" have occurred upon occurrence of the MUX.

As a result, there is an advantage that additional resource utilization through "spatial separation" and the like is possible.

This may be interpreted to reduce the Rx chain (e.g., from two to one).

A down-select among the following two options may be performed.

Option 2-1 is that, from a UE perspective, CSI-RS is not multiplexed on PDCCH OFDM symbol(s) for normal slots.

The CSI-RS related configuration may be provided to the UE on the condition that the MUX is not performed only for a PDCCH region such as a control resource set (CORESET) monitored by the UE.

Option 2-2 is that, from a UE perspective, CSI-RS can be multiplexed on PDCCH OFDM symbol(s) for normal slots.

For reference, a PDCCH decoding behavior of the UE is not changed by the option 2-2.

The UE follows at least one of the above proposed options (option 2-1 and option 2-2).

In this instance, the base station may additionally provide the UE with information about "restricted sets of CORESET(s) and/or PDCCH symbol(s)" in such a way to indicate that an operation of the above-described MUX will be applied to "a set of some CORESET(s) and/or some PDCCH symbol(s)" of CORESET(s) and/or PDCCH symbol(s), that are applied targets.

Hence, the UE may use only information provided by the base station to decide whether "missed CSI-RS RE(s)" have occurred upon occurrence of the MUX.

As a result, there is an advantage that additional resource utilization through "spatial separation" and the like is possible.

A down-select among the following two options may be performed.

Option 3-1 is that, from a UE perspective, CSI-RS is not multiplexed on all potential DMRS OFDM symbols for slot with at least 7 or 14 OFDM symbols.

CSI-RS related configuration may be provided to the corresponding UE on the condition that the CSI-RS is not multiplexed only for DMRS symbols on which the UE is scheduled (or will be scheduled).

Option 3-2 is that, from a UE perspective, potential additional DMRS OFDM symbol(s) can be transmitted, when CSI-RS does not exist in the OFDM symbol(s) of an additional DMRS in a slot with scheduled PDSCH, For reference, in the option 3-2, the CSI-RS is not multiplexed on potential front-loaded DMRS OFDM symbol(s).

Such an operation may be applied only to a specific type of CSI-RS.

For example, the corresponding operation may be restricted to aperiodic, semi-persistent, and/or periodic CSI-RSs.

Option 3-3 is that, from a UE perspective, CSI-RS can be multiplexed on all potential DMRS OFDM symbol(s).

Here, DMRSs allocated to other UE are not targeted as above.

Or, it may be configured to provide DMRS configuration related information allocated to specific UEs, and at the same time apply the at least one operation to DMRS locations for the specific UEs based on the above configuration.

At least one of the above operations may be restricted to be applied only to a specific type of CSI-RS.

Here, examples of the specific type of CSI-RS may include CSI-RS for CSI acquisition, CSI-RS for beam management (BM), and/or CSI-RS for radio resource management (RRM).

For example, different (or independent) operations may be defined for each of the above condition items so that the above operations are restrictively applied only to some of aperiodic, semi-persistent, and/or periodic CSI-RSs.

For example, the CSI-RS that allows the MUX to occur may be limited only to CSI-RS resource(s) for BM.

This is because CSI-RSs for BM are not typically related to subband reporting and may be limited only to wideband BM-related reporting.

For example, when the UE are configured to receive a plurality of CSI-RS resources from the base station, CSI-RS resources for BM may be configured in a type capable of being multiplexed with a specific SS block, CORESET, and/or DMRS (on the frequency domain) as described above.

However, CSI-RS resources (MIMO feedback) for CSI acquisition may not be allowed to be multiplexed with the specific SS block, the CORESET, and/or the DMRS (on the frequency domain).

In this case, the UE does not expect the above multiplexing, and preferably, the base station does not provide the above configuration.

The above descriptions serve as examples, and in the present specification, specific restrictions that the above MUX type can be configured may be given to only the at least one specific type of CSI-RS resource(s) (e.g., at least one type of "CSI-RS for CSI acquisition, CSI-RS for beam management (BM), or CSI-RS for RRM" and/or "aperiodic, semi-persistent, and/or periodic CSI-RSs").

And/or, in order to generate transmission configuration by the MUX between specific signals (or channels) as described above, only if a specific CSI-RS resource is equal to or less than specific N-port(s), the configuration of the MUX type is possible.

In this instance, the above specific N value may be determined in advance, or may be configured (or indicated) to the UE by RRC, MAC command element (CE), and/or DCI signaling.

Or, in order to generate transmission configuration by the MUX between specific signals as described above, if a CSI-RS density (D) configured for a specific CSI-RS resource is less than 1, at least one of the following operations may be configured.

Multiplexing is not allowed.

A PRB index causing a collision is shifted.

For example, in D=⅓, PRB # n=CSI-RS, PRB #(n+1)= No CSI-RS, PRB #(n+2)=No CSI-RS structure, when for specific n, a collision occurs at # n and # n+1 and does not occur at # n+2, a CSI-RS transmission location limitedly to a corresponding PRB set is shifted to # n+2.

As in such an example, there may other shift-related examples of a specific CSI-RS transmission location when the collision occurs in a manner of specific other pattern (or rule).

If a collision occurs on a specific tone (or subcarrier), a specific operation may be configured to adjust (or shift) RE-level comb offset.

If a comb shift value changes per port (group), a PRB index is shifted for ports (groups) on which a collision occurs.

Or, in case of CSI-RS density (D)>1 configured for a specific CSI-RS resource that allows transmission configuration by MUX between specific signals to be able to occur, at least one of the following operations may be configured.

Multiplexing is not allowed.

If a collision occurs on a specific tone, a specific operation may be configured (or indicated or performed) to adjust (or shift) Re-level comb offset.

Or, a method for configuring D (e.g., D=2, where D is smaller than a previously set value) of another value, at which a collision does not occur for a limited time, to a specific slot, on which a collision occurs, may be applied.

Or, zero-power (ZP) CSI-RS(s) for an interference measurement resource (IMR) and/or non-zero-power (NZP) CSI-RS(s) for an IMR in a manner capable of being multiplexed with specific SS block, CORESET, and/or DMRS (on a frequency domain) can be configured in the above MUX type.

This is because a critical issue related to the subband reporting may not occur since the ZP or NZP CSI-RS resources for IMR are used for interference measurement.

If interference of subband-wise of specific subband reporting is measured with configuration of the ZP or NZP CSI-RS resources for IMR and is reflected in the CSI, the UE may be configured so that the IMR can perform processing for a specific missed RE by applying at least one method proposed above.

As another example, a spatial quasi co-located (QCL) relation between SS block (SSB), CORESET, and/or DMRS and CSI-RS is described.

Here, the quasi co-located may be interpreted as follows.

That is, if large-scale features of a channel, over which symbols on one antenna port are transmitted, are inferred from a channel over which symbols on different antenna ports are transmitted, two antenna ports are said to be quasi co-located.

The large-scale features include one or more of delay spread, Doppler spread, Doppler shift, average gain, and average delay.

A specific SS block, CORESET, and/or DMRS may apply a specific Rx beam setting that allow the UE to receive the specific SS block, the CORESET, and/or the DMRS, etc. by respectively configured specific (analog) beam indications (e.g., via CRI) or specific spatial QCL indications.

Here, the specific Rx beam setting may be expressed as, for example, a Rx beam direction, a spatial Rx parameter, a spatial domain receive filter, QCL relation, spatial QCL, and the like.

More specifically, the fact that there is a QCL relation between the specific SSB, the CORESET, and/or the DMRS and CSI-RS may be interpreted to mean a Rx beam direction of the UE receiving the specific SSB, the CORESET, and/or the DMRS is the same as a Rx beam direction of the UE receiving the CSI-RS, or mean that the UE receives the specific SSB, the CORESET, and/or the DMRS and the CSI-RS using the same spatial domain receive filter.

Herein, the CSI-RS may be used for (time/frequency) tracking, channel acquisition, beam management (BM), etc. However, the above relation may be limited to only when the CSI-RS is used for beam management.

Here, that fact that the CSI-RS has been configured for beam management may mean when 'CSI-RS-ResourceRep' that is a higher layer parameter is configured as ON in a CSI-RS resource set, the CSI-RS resource set is used for beam management.

In this case, an antenna port of CSI-RS (for BM) may be configured to 1 or 2.

The SSB (SS Block) and the CORESET may be expressed as a resource block or a resource set including at least one control signal (or control channel).

The reason is because the SSB includes a control signal (e.g., synchronization signal, demodulation signal, etc.) and a control channel (e.g., physical broadcast channel), and the CORESET includes a control signal (e.g., demodulation signal) and a control channel (e.g., physical downlink control channel).

If there is CSI-RS (for beam management) that is configured to be MUXed (or multiplexed) between the above-described signals (and/or channels) (on the frequency domain), and a specific spatial QCL indication configured to receive the specific SS block, the CORESET and/or the DMRS is different from reception beam (setting) configured to receive the CSI-RS, there may be a problem that the UE cannot simultaneously receive the multiplexed signals.

In particular, as described above, when Rx chain of the UE is less than the number of received CSI-RSs, the above problem may occur.

For example, if Rx (processing) chains (or TXRUs) of the UE are provided (or implemented) in plural so that the UE can receive simultaneously the multiplexed signals, the UE can receive a signal of a specific band using a specific Rx beam through some Rx chains and can receive a multiplexed signal of other band using other Rx beam through other some Rx chains.

However, the UE(s) (implemented at relatively low cost) that do not include sufficiently the Rx chains cannot receive fully the transmitted CSI-RS.

In addition, the UE may (initially) inform the base station of information about specific capability related to the number of Rx chains supporting in the UE (implemented to the UE).

In this case, the base station may configure multiplexed transmission between the above signals (and/or channels) to UEs that can perform the simultaneous reception through different Rx beams, and may not configure multiplexed transmission between the above signals (and/or channels) to UEs that have difficulty (or impossibility) in the simultaneous reception, with reference to the information about specific capability.

The multiplexed transmission between the above signals (and/or channels) may mean that the CSI-RS and the SS block, the CORESET and/or the DMRS are multiplexed (on a frequency axis) and are transmitted to the UE.

Further, for the UE that is not able to receive simultaneously the multiplexed signals through the different Rx beams, if transmission of the multiplexed signals is achieved by the UE (or if (previously) configured specific beam indications (or spatial QCL indications) between the multiplexed signals are differently configured), the corresponding UE may be defined to perform at least one of the following operations.

Here, the following operations of the UE may be interpreted as a kind of collision handling operation.

When different beam indications are configured between a SS block and a specific CSI-RS that are multiplexed (on a frequency domain), the UE prioritizes a Rx beam indication for the SS block.

In this instance, it may be defined to override the reception of the specific CSI-RS through the Rx beam for the SS block, or to skip (or drop) the reception overriding for the CSI-RS of the UE at a corresponding time point.

The reason is because the reception for the SS block is more important than the reception for the specific CSI-RS.

Alternatively, on the contrary, it may be defined to prioritize a Rx beam for the specific CSI-RS, and the above operation may be applied reversely.

This is because an operation (e.g., short term CSI reporting) related to a short-term for the specific CSI-RS is relatively more important.

Or, it may be defined to ensure previously an operation of 'the UE does not assume that different beam indications are configured between multiplexed signals (and/or channels)'. However, this should be guaranteed by the base station.

When different beam indications are configured between a CORESET (e.g., PDCCH (region)) and a specific CSI-RS that are multiplexed, a Rx beam indication for the former (CORESET) is preferentially applied.

In this instance, it may be defined to override the reception of the specific CSI-RS through the Rx beam for the CORESET, or to skip (or drop) the reception overriding for the CSI-RS of the UE at a corresponding time point. In the same manner, this is because the reception of the UE for the CORESET is more important.

Alternatively, on the contrary, it may be defined to prioritize a Rx beam for the specific CSI-RS, and the above operation may be applied reversely. This is because the reception of the UE for the CSI-RS is more important.

Alternatively, it may be defined to ensure previously an operation of 'the UE does not assume that different beam indications are configured between multiplexed signals (and/or channels)'. However, this should be guaranteed by the base station.

When different beam indications are configured between a DMRS and a specific CSI-RS that are multiplexed, a Rx beam indication for the former (DMRS) is preferentially applied.

In this instance, it may be defined to override the reception of the specific CSI-RS through the Rx beam for the DMRS, or to skip (or drop) the reception overriding for the CSI-RS of the UE at a corresponding time. This is because the reception of the UE for the DMRS (and data of a current time point) is more important.

Alternatively, on the contrary, it may be defined to prioritize a Rx beam for the specific CSI-RS, and the above operation may be applied reversely.

Alternatively, it may be defined to ensure previously an operation of 'the UE does not assume that different beam indications are configured between multiplexed signals (and/or channels)', and the base station should guarantee it.

FIG. 8 is a flow chart illustrating an operation of a UE related to reception of a CSI-RS proposed by the present specification.

First, a UE receives a resource block from a base station based on a first spatial Quasi-Co location (QCL) related parameter configured for reception of the resource block including at least one control channel in S810.

The resource block may be a synchronization signal block (SSB) or a control resource set (CORESET).

For example, when the resource block is the CORESET, the first spatial QCL related parameter may be configured for a specific resource of the resource block.

The specific resource of the resource block may be a resource related to a physical downlink control channel (PDCCH) of the CORESET.

If the resource block and a CSI-RS are configured on the same symbol, the UE may expect or assume that the first spatial QCL related parameter and a second spatial QCL related parameter configured for the reception of the CSI-RS are equally configured.

In this case, the UE configures a beam for receiving the CSI-RS based on the second spatial QCL related parameter in S820.

The UE receives the CSI-RS from the base station through the configured beam in S830.

The spatial QCL related parameter may represent a parameter related to a reception beam direction of the UE.

In particular, the resource block and the CSI-RS may be frequency division multiplexed (FDM) on the same symbol.

As described above, a reason to define a QCL for a spatial RX parameter (e.g., RX reception beam indication, RX beam direction, etc.) between the resource block (e.g., SSB, etc.) and the CSI-RS is to support a UE in which the number of (implemented) RX chains is less than the number of CSI-RS resources to be received.

The above operations may be limited to a case where the CSI-RS is used for beam management (BM).

The reason is because the CSI-RS for BM supports not the subband reporting but the wideband reporting. Therefore, when the resource block and the CSI-RS are FDMed, the collision problem in the subband mentioned above does not occur.

When the CSI-RS is used for the BM, the number of antenna ports of the CSI-RS may be limited to a specific number (N) or less.

Preferably, the N value may be 1 or 2, and the corresponding value may be configured by radio resource control (RRC) signaling.

FIG. 9 is a flow chart illustrating an operation of a base station related to transmission of a CSI-RS proposed by the present specification.

First, a base station configures a resource block including at least one control channel and a CSI-RS on the same symbol in S910.

The resource block may be a synchronization signal block (SSB).

The base station equally configures spatial Quasi-Co location (QCL) related parameters for the resource block and the CSI-RS in S920.

In the same manner, a reason to define a QCL for a spatial RX parameter (e.g., RX reception beam indication, RX beam direction, etc.) between the resource block (e.g., SSB, etc.) and the CSI-RS is to support a UE in which the number of (implemented) RX chains is less than the number of CSI-RS resources to be received.

The CSI-RS may be limited to being used for beam management (BM).

When the CSI-RS is used for the BM, the number of antenna ports of the CSI-RS may be limited to a specific number (N) or less.

For example, the N value may be 1 or 2, and the corresponding value may be transmitted to the UE via radio resource control (RRC) signaling.

The base station transmits the resource block and the CSI-RS to the UE on the configured same symbol via frequency division multiplexing (FDM) in S930.

FIG. 10 is another flow chart illustrating an operation of a UE related to reception of a CSI-RS proposed by the present specification.

First, a base station configures a resource block including at least one control channel and a CSI-RS on the same symbol in S1010.

The resource block may be a control resource set (CORESET).

The base station equally configures spatial Quasi-Co location (QCL) related parameters for a specific resource of the resource block and the CSI-RS in S1020.

Here, the specific resource of the resource block may be a resource or a resource domain related to a physical downlink control channel (PDCCH) of the CORESET.

In the same manner, a reason to define a QCL for a spatial RX parameter (e.g., RX reception beam indication, RX beam direction, etc.) between the resource block (e.g., CORESET, etc.) and the CSI-RS is to support a UE in which the number of (implemented) RX chains is less than the number of CSI-RS resources to be received.

The base station transmits the resource block and the CSI-RS to the UE on the configured same symbol via frequency division multiplexing (FDM) in S1030.

General Device to which the Present Disclosure is Applicable

FIG. 11 is a block diagram of a wireless communication device to which methods proposed in the present disclosure may be applied.

Referring to FIG. 11, a wireless communication system includes a base station 1110 and multiple UEs 1120 located within a region of the base station.

Each of the base station and the UE may be represented as a wireless device.

The base station includes a processor 1111, a memory 1112, and a radio frequency (RF) module 1113. The processor 1111 implements functions, procedures, and/or methods proposed in FIGS. 1 to 10. Layers of a wireless interface protocol may be implemented by the processor. The memory is connected to the processor and stores various types of information required to drive the processor. The RF module is connected to the processor to transmit and/or receive a wireless signal.

The UE includes a processor 1121, a memory 1122, and an RF module 1123.

The processor implements functions, procedures, and/or methods proposed in FIGS. 1 to 10. Layers of a wireless interface protocol may be implemented by the processor. The memory is connected to the processor and stores various types of information required to drive the processor. The RF module is connected to the processor to transmit and/or receive a wireless signal.

The memory 1112 or 1122 may be inside or outside the processor 1111 or 1121, and may be connected to a processor through various well-known means.

In addition, the base station and/or UE may have a single antenna or multiple antennas.

FIG. 12 is a block diagram of a communication device according to an embodiment of the present disclosure.

Particularly, FIG. 12 is a diagram illustrating a UE shown in FIG. 11 in more detail.

Referring to FIG. 12, the UE includes a processor (or digital signal processor; DSP) 1210, an RF module (RF unit) 1235, a power management module 1205, an antenna 1240, a battery 1255, a display 1215, a keypad 1220, a memory 1230, a Subscriber Identification Module (SIM) card 1225 (which may be optional), a speaker 1245 and a microphone 1250. The UE may include a single antenna or multiple antennas.

The processor 1210 may be configured to implement the functions, procedures and/or methods proposed by the present disclosure as described in FIGS. 1 to 10. Layers of a wireless interface protocol may be implemented by the processor 1210.

The memory 1230 is connected to the processor 1210 and stores information related to operations of the processor 1210. The memory 2330 may be located inside or outside the processor and may be connected to the processors through various well-known means.

A user enters instructional information, such as a telephone number, for example, by pushing the buttons of a keypad 1220 or by voice activation using the microphone 1250. The processor receives and processes the instructional information to perform the appropriate function, such as to dial the telephone number. Operational data may be retrieved from the SIM card 1225 or the memory 1230 to perform the function. Furthermore, the processor may display the instructional and operational information on the display 1215 for the user's reference and convenience.

The RF module 1235 is connected to the processor, transmits and/or receives an RF signal. The processor forwards instructional information to the RF module, to initiate communication, for example, transmits radio signals comprising voice communication data. The RF module includes a receiver and a transmitter to receive and transmit radio signals. An antenna 1240 facilitates the transmission and reception of radio signals. Upon receiving radio signals, the RF module may forward and convert the signals to baseband frequency for processing by the processor. The processed signals may be transformed into audible or readable information outputted via the speaker 1245.

FIG. 13 is a diagram illustrating an example of an RF module of a wireless communication apparatus to which the method proposed in the present disclosure may be applied.

Particularly, FIG. 13 shows an example of an RF module that may be implemented in Frequency Division Duplex (FDD) system.

First, in a transmit path, the processor described in FIGS. 11 and 12 processes data to be transmitted and provides an analog output signal to transmitter 1310.

Within the transmitter 1310, the analog output signal is filtered by a low pass filter (LPF) 1311 to remove undesired images caused by prior digital-to-analog conversion (ADC), upconverted from baseband to RF by an upconverter (Mixer) 1312, and amplified by a variable gain amplifier (VGA) 1313. The amplified signal is filtered by a filter 1314, further amplified by a power amplifier (PA) 1315, routed through duplexer(s) 1350/antenna switch(s) 1360, and transmitted via an antenna 1370.

In addition, in the receive path, an antenna 1370 receives signals from exterior and provides the received signals, which is routed through antenna switch(s) 1360/duplexer(s) 1350 and provided to the receiver 1320.

Within the receiver 1320, the received signal is amplified by a low noise amplifier (LNA) 1323, filtered by a band pass filter 1324, and downconverted from RF to baseband by a downconverter (Mixer) 1325.

The downconverted signal is filtered by a low pass filter (LPF) 1326, and amplified by a VGA 1327 to obtain an analog input signal, which is provided to the processor described in FIG. 11 and FIG. 12.

Further, a local oscillator (LO) generator 1340 generates and provides transmission and reception LO signals to upconverter 1312 and downconverter 1325, respectively.

In addition, a phase locked loop (PLL) 1330 may receive control information from the processor and provide control signals to LO generator 1340 to generate the transmission and reception LO signals at the proper frequencies.

The circuits shown in FIG. 13 may be arranged differently from the configuration shown in FIG. 13.

Figure 14:
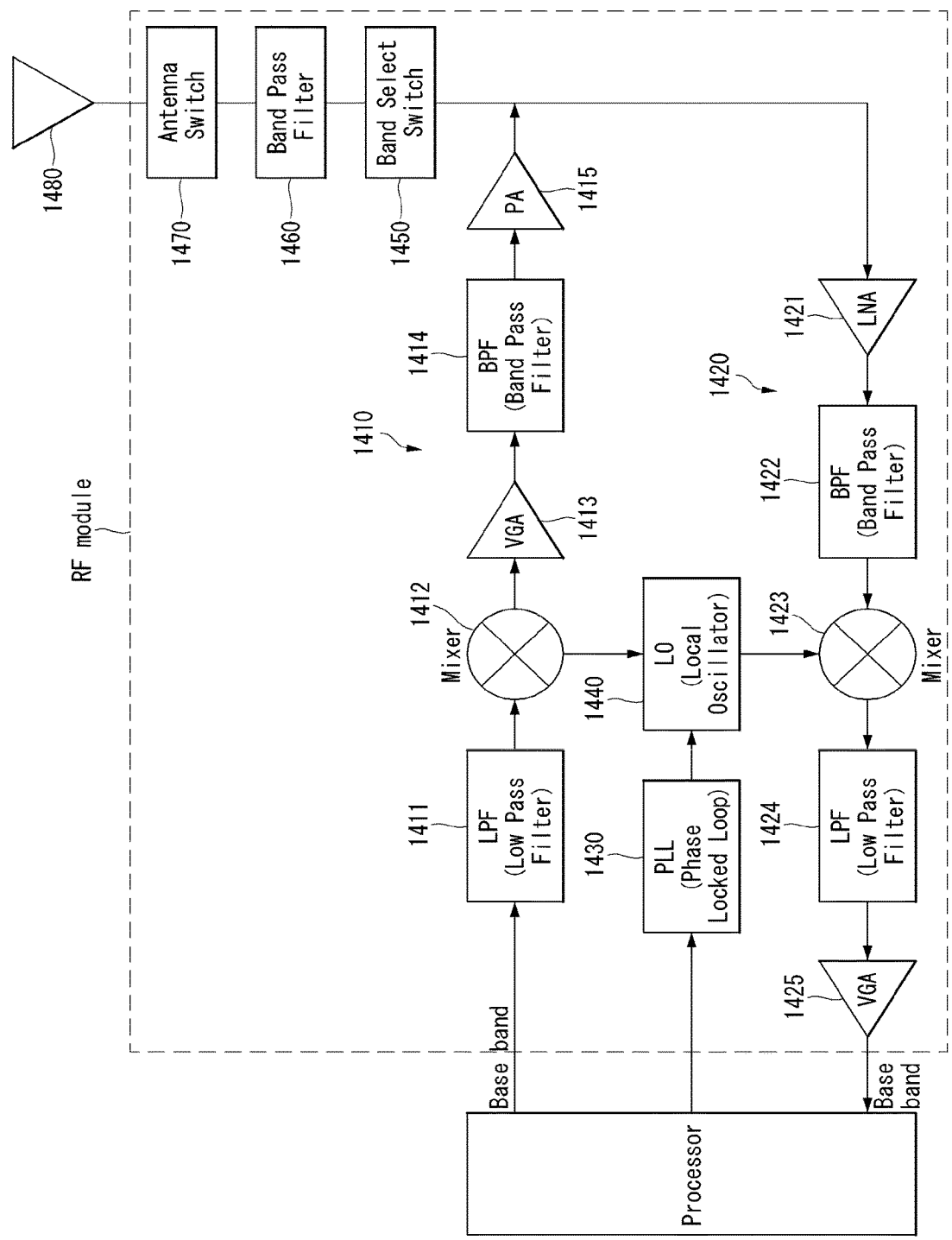
FIG. 14 illustrates another example of a RF module of a wireless communication device to which a method proposed by the present specification is applicable.

FIG. 14 is a diagram illustrating another example of an RF module of a wireless communication apparatus to which the method proposed in the present disclosure may be applied.

Particularly, FIG. 14 shows an example of an RF module that may be implemented in Time Division Duplex (TDD) system.

The transmitter 1410 and the receiver 1420 of the RF module in the TDD system are the same as the structures of the transmitter and the receiver of the RF module in the FDD system.

Hereinafter, only the structure of the RF module of the TDD system is described, which is different from the RF module of the FDD system, and the same structure is referred to the description of FIG. 13.

The signal amplified by a power amplifier (PA) 1415 of a transmitter is routed through a band select switch 1450, a band pass filter (BPF) 1460 and an antenna switch(s) 2570, and transmitted via an antenna 1480.

Further, in the receive path, the antenna 1480 receives signals from exterior and provides the received signals, which is routed through the antenna switch(s) 1470, the band pass filter (BPF) 1460, and the band select switch 1450, and provided to the receiver 1420.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

A method of transceiving a reference signal in the wireless communication system of the present invention has been described with reference to an example applied to a 3GPP LTE/LTE-A system or a 5G system (New RAT system), it is also applicable to various wireless communication systems.

The invention claimed is:

1. A method for receiving, by a user equipment (UE), a channel state information (CSI)-reference signal (RS) in a wireless communication system, the method comprising:
   receiving, from a base station and based on a first spatial Quasi-Co location (QCL) related parameter, a resource block on an orthogonal frequency-division multiplexed (OFDM) symbol, the resource block including at least one control channel; and
   receiving, from the base station and based on a second spatial QCL related parameter, the CSI-RS on the OFDM symbol on which the resource block is received,
   wherein based on the resource block and the CSI-RS both being configured to be received on the OFDM symbol:
      (i) the first spatial QCL related parameter and the second spatial QCL related parameter are equally configured to configure a reception beam for the CSI-RS, based on a reception beam for the resource block, and
      (ii) the resource block and the CSI-RS are frequency division multiplexed (FDM) in a frequency domain on the OFDM symbol.

2. The method of claim 1, wherein the CSI-RS is received from a CSI-RS resource configured for beam management (BM).

3. The method of claim 2, wherein the CSI-RS is a CSI-RS of a specific number of ports or less.

4. The method of claim 3, wherein a value of the specific number of ports is configured by radio resource control (RRC) signaling.

5. The method of claim 1, wherein the resource block is a synchronization signal block (SSB) or a control resource set (CORESET).

6. The method of claim 5, wherein based on the resource block being the CORESET, the first spatial QCL related parameter is configured for a specific resource of the CORESET.

7. The method of claim 6, wherein the specific resource of the CORESET is a resource related to a physical downlink control channel (PDCCH) of the CORESET.

8. The method of claim 1, further comprising:
   configuring a beam for receiving the CSI-RS based on the second spatial QCL related parameter; and
   receiving the CSI-RS from the base station through the configured beam.

9. A user equipment (UE) configured to receive a channel state information (CSI)-reference signal (RS) in a wireless communication system, the UE comprising:
   a radio frequency (RF) module configured to transmit and receive a radio signal; and
   a processor functionally coupled to the RF module,
   wherein the processor is configured to:
   receive, from a base station through the RF module and based on a first spatial Quasi-Co location (QCL) related parameter, a resource block on an orthogonal frequency-division multiplexed (OFDM) symbol, the resource block including at least one control channel; and receive, from the base station through the RF module and based on a second spatial QCL related parameter, the CSI-RS on the OFDM symbol on which the resource block is received, wherein based on the resource block and the CSI-RS both being configured to be received on the OFDM symbol:

(i) the first spatial QCL related parameter and the second spatial QCL related parameter are equally configured to configure a reception beam for the CSI-RS, based on a reception beam for the resource block, and (ii) the resource block and the CSI-RS are frequency division multiplexed (FDM) in a frequency domain on the OFDM symbol.

* * * * *